United States Patent [19]
Sugiura

[11] Patent Number: 5,563,713
[45] Date of Patent: Oct. 8, 1996

[54] IMAGE PROCESSING METHOD AND APPARATUS WITH ADDING OF A WHITE OUTLINE TO AN OUTLINE OF A CHARACTER IMAGE

[75] Inventor: Takashi Sugiura, Komae, Japan

[73] Assignee: Canon Kabushiki Kaisha, Tokyo, Japan

[21] Appl. No.: 165,704

[22] Filed: Dec. 13, 1993

[30] Foreign Application Priority Data

Dec. 16, 1992 [JP] Japan ................... 4-335815

[51] Int. Cl.⁶ ............... H04N 1/40; H04N 1/46
[52] U.S. Cl. ............ 358/298; 358/448; 358/532
[58] Field of Search ................ 358/298, 296, 358/444, 447, 448, 452, 462, 464–466, 530, 532; 382/199, 200, 237, 254, 256–258, 263, 266; 395/109, 110, 112

[56] References Cited

U.S. PATENT DOCUMENTS

| | | | |
|---|---|---|---|
| 5,206,719 | 4/1993 | Ikeda et al. ................. | 358/453 X |
| 5,283,671 | 2/1994 | Stewart et al. ................ | 358/532 |
| 5,357,353 | 10/1994 | Hirota ......................... | 358/530 |
| 5,392,137 | 2/1995 | Okubo ......................... | 358/448 X |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing method and apparatus for preventing a character image from being thinned in hatching processing. First, edge-enhancing is performed upon a character image pattern before it is synthesized with a hatching pattern. The edge-enhancing is made by Laplacian processing, increasing density of an image signal corresponding to a hatch area, or fatting of the character image. The exterior outline of the edge-enhanced character image is extracted and data for forming a white-outline is generated. Finally, the white-outline is added to the edge-enhanced character image pattern, and the hatching pattern is synthesized with the character image pattern.

11 Claims, 12 Drawing Sheets

IMAGE PROCESSING METHOD AND APPARATUS WITH ADDING OF A WHITE OUTLINE TO AN OUTLINE OF A CHARACTER IMAGE

BACKGROUND OF THE INVENTION

The present invention relates to an image processing method and apparatus and, more particularly, to an image processing method and apparatus* for performing hatching upon a character and image processing so as to provide a white-outline around the character. The image processing method and apparatus can be applied to, e.g., a digital copying machine.

Conventionally, in hatching a character image, a method of adding a white-outline to the exterior outline of the character has been proposed to clear the border between the character and the hatch area.

However, this method has the following drawback.

In a case where image information is binarized with one threshold, and a signal for generating white-outline at the exterior outline of the character is generated based on the binary data, if an edge portion of the character has a low density, the white-outline encroaches upon the character area. As a result, the hatching-processed character is thinned.

In an image processing apparatus such as a digital copying machine, when an original image is read by a solid-state image sensor such as a CCD (charge coupled device), even though the density of an edge portion of a character in the original image is not low, tolerance of optical system of the device lowers the density of edge portion of a character in a reproduced image.

SUMMARY OF THE INVENTION

Accordingly, it is an object of the present invention to provide an image processing method which prevents a character represented in an original image in hatching from being thinned in processing.

According to the present invention, the foregoing object is attained by providing an image processing method of adding a white-outline to outline of a character image with which a predetermined pattern is synthesized. The method comprises the steps of generating the predetermined pattern, inputting an image signal, sharpening the edge of the character image represented by the image signal, creating data for adding a white-outline to the outline of the character image to the character image pattern; and synthesizing the predetermined pattern with the sharpened character image in accordance with the created data so that the white-outline can be added to the outline of the character image.

It is another object of the present invention to provide an image processing apparatus which prevents a character represented in an original image from being thinned in hatching processing.

According to the present invention, the foregoing object is attained by providing an image processing apparatus capable of creating a white-outline along circumference of a character image with which a predetermined pattern is synthesized. The apparatus comprises generation means for generating the predetermined hatching pattern, input means for inputting an image signal, sharpening means for sharpening the edge of the character image represented by the image signal, creation means for creating data for adding a white outline along the circumference of the character image to the character image pattern, and synthesizing means for synthesizing the hatching pattern with the sharpened character image in accordance with the data created by the creation means so that the white outline can be created along the circumference of the character image.

In accordance with the present invention as described above, an edge portion of a character image pattern represented by an input image signal is sharpened, and the sharpened character image pattern is synthesized with a hatching pattern. At this time, the synthesizing of the character image pattern with the hatching pattern is made so as to provide a white-outline around the character image pattern.

The invention is particularly advantageous since thinning of a character represented in an original image can be prevented in hatching processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DETAILED DESCRIPTION OF THE PREFERRED EMBODIMENT

Preferred embodiment of the present invention will be described in detail in accordance with the accompanying drawings.

[First Embodiment]

Figure 1:
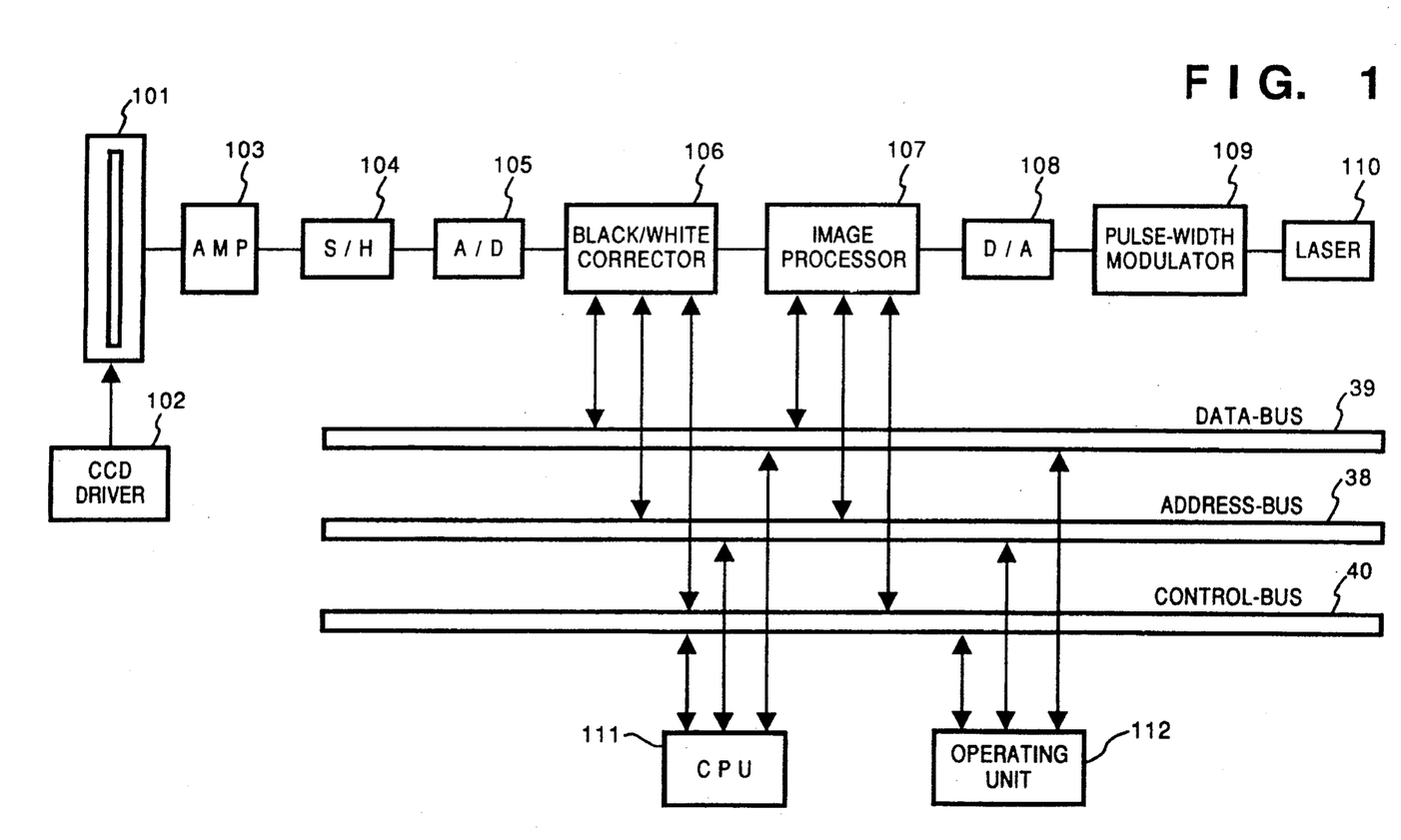
FIG. 1 is a block diagram showing the configuration of a digital copying machine which is a typical embodiment of the present invention.

FIG. 1 is a block diagram showing the configuration of a digital copying machine which is a typical embodiment of the present invention. In FIG. 1, reference numeral 101 denotes a CCD image sensor (CCD); 102, a CCD driver; 103, an amplifier; 104, a S/H (sample-hold) circuit; 105, an A/D converter; 106, a black/white corrector; 107, an image processor; 108, a D/A converter; 109, a pulse-width modulator; 110, a laser; 111, a CPU; and 112, an operating unit. Numerals 38 to 40 denote CPU busses, specifically, 38 denotes an address bus; 39, a data bus; and 40, a control bus.

Next, the operation of the above construction will be described.

An exposure lamp (not shown) irradiates an original image. The CCD 101 reads the reflection light, and the amplifier 103 amplifies the read data to a predetermined level. The CCD 101 is driven by the CCD driver 102. Each of the sensors in the CCD 101 is aligned in one line and moves in a fixed direction with respect to the original image. The direction along the line of the CCD is the main-scanning direction, and the direction in which the CCD moves is the subscanning direction. The S/H circuit 104 sample-holds a predetermined signal level from the amplified image signal. The A/D converter 105 converts the sample-held analog image signal to a digital signal and outputs the signal to the black/white corrector 106.

The black/white corrector 106 performs correction of low-level output of the CCD corresponding to the character in the original image, and correction of optical system and correction of fluctuation due to high-level output of the CCD corresponding to the background area of the original image. The image processor 107 performs various editings, which include particular processings in a digital copying machine such as enlargement/reduction, negative-positive inversion and moving, upon the corrected image information. The image processor 107 also performs converting from the luminance signal to a density signal, and density correction corresponding to the output characteristic of a printer.

Further, the image processor performs hatching and anti-thinning processings which are remarkable features of the present embodiment. After these various image processings, the D/A converter 108 converts the digital image signal to an analog image signal again. The pulse-width modulator 109 modulates the analog signal to a pulse-width level. The laser 110 writes the signal on an electrostatic-drum (not shown), and though the explanation will be omitted, an electrophotographic processing copies the original image.

It should be noted that the black/white corrector 106 and the image processor 107 are connected to the CPU 111 and the operating unit 112 via the address bus 38, the data bus 39 and the control bus 40, and are controlled by instructions from the CPU 111 and the operating unit 112.

Figure 2:
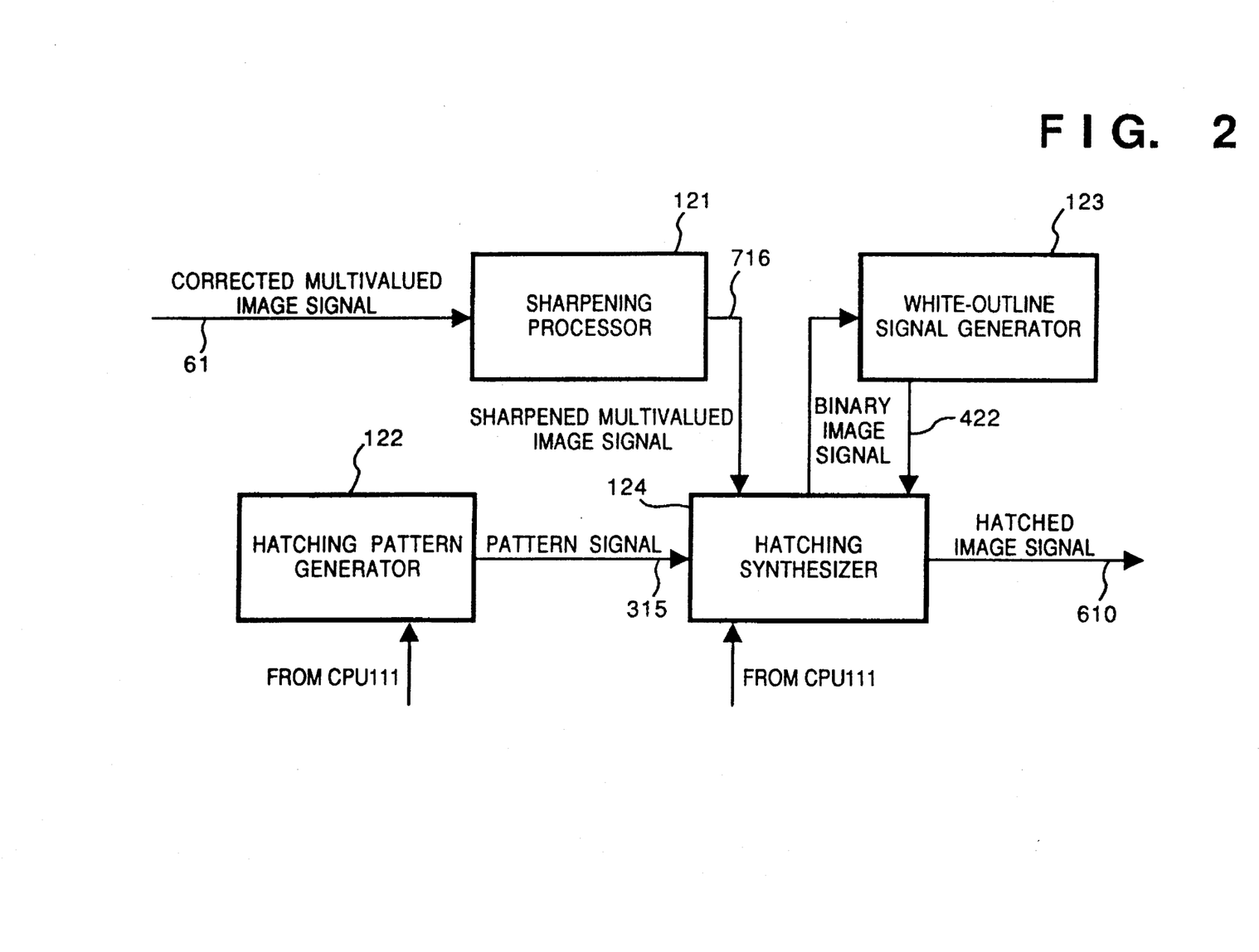
FIG. 2 is a block diagram showing the construction of image processor 107 in detail.

FIG. 2 is a block diagram showing the detailed construction of the image processor 107. FIG. 2 only shows elements for the hatching and anti-thinning processings as features of the present embodiment. As shown in FIG. 2, the image processor 107 comprises sharpening processor 121, hatching pattern generator (hereinafter simply referred to as "pattern generator") 122, white-outline signal generator 123 and hatching synthesizer 124.

First, the sharpening processor 121 inputs corrected multivalued image signal 61 outputted from the black/white corrector 106, and performs sharpening upon an edge portion of the image. The hatching synthesizer 124 binarizes the edge-sharpened image signal 716. The white-outline signal generator 123 extracts an area to be a white-outline portion and to be added to the outline of the character image, based on the binary image signal. The white-outline signal generator 123 outputs the extracted signal indicative of the area to be a white-outline portion as white-outline signal 422 to the hatching synthesizer 124.

On the other hand, the pattern generator 122 generates a hatching pattern in accordance with instructions from the CPU 111 and the operating unit 112, and outputs hatching pattern signal 315 (hereinafter referred to as the "pattern signal") to the hatching synthesizer 124. Finally, the hatching synthesizer 124 overlays a hatching pattern on the character image in accordance with the pattern signal 315 and the white-outline signal 422 in consideration of the white-outline portion.

Thus, the image processor 107 outputs image signal 610 indicative of an image where white-outline is added to the character outline and further the hatching pattern is added to the image.

<Hatching Processing>

First, the hatching result according to the present embodiment will be described.

Figure 3A:
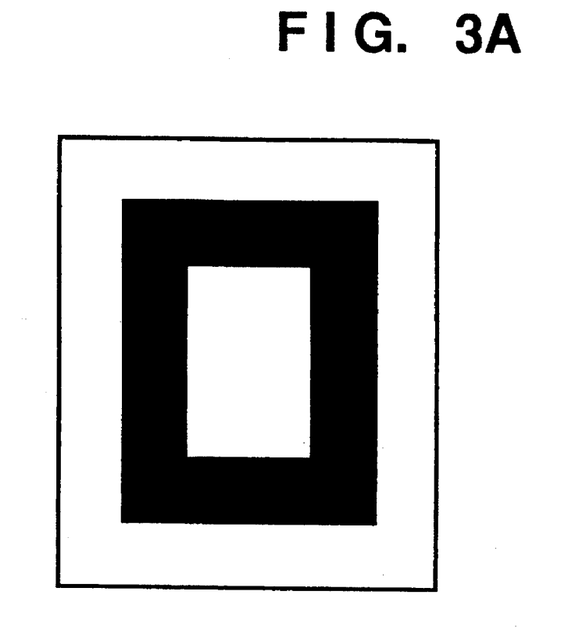
FIG. 3A illustrates an original image.
Figure 3B:
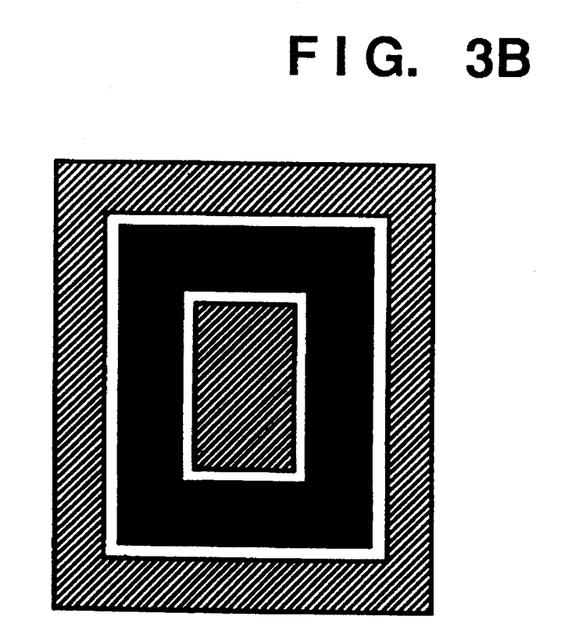
FIG. 3B illustrates a hatching result.

FIG. 3A illustrates an original image; and FIG. 3B, an output result of a hatched image. As shown in FIG. 3B, image areas except the solid-black area are hatched, and white-outline is added to the borders between the solid-black area and the hatched areas.

Next, the hatching processing according to the present embodiment will be described.

<Image Sharpening>

Figure 4A:
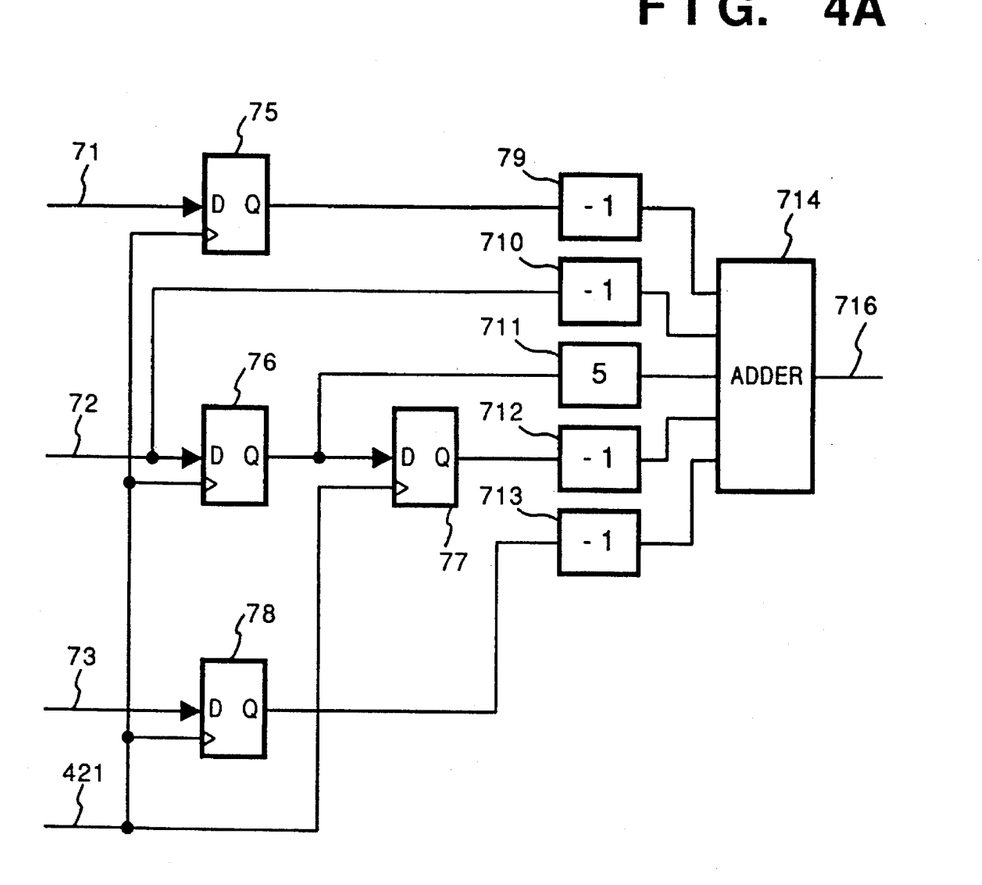
FIG. 4A is a block diagram showing the construction of a circuit which performs sharpening processing.

FIG. 4A is a block diagram showing the construction of the sharpening processor 121 for the sharpening processing. Though sharpening includes various methods, the Laplacian processing will be employed here.

Figure 4B:
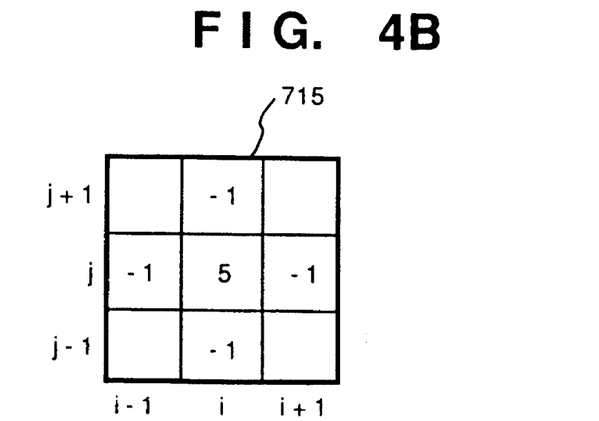
FIG. 4B illustrates the Laplacian matrix in the sharpening processing.

In FIG. 4A, numeral 71 to 73 denote image signals for three lines; 421, an image transfer clock (ICLK); 75 0 to 78, D-flip-flops (D-FF); 79 and 710 to 713, respectively multipliers for multiplying a coefficient in each block by an input value; and 714, an adder. Numeral 715 in FIG. 4B denotes the Laplacian matrix for the sharpening. In the matrix, the central cell (i, j) corresponds to the pixel of interest. The Laplacian sharpening is made by subtracting Laplacian from the original image:

$$f(i,j) - \nabla^2 f(i,j) = 5f(i,j) - \{f(i-1,j) + f(i,j-1) + f(i,j+1) + f(i+1,j)\}$$

That is, subtracting the Laplacian representing a blurred image from the original image f(i, j) obtains a sharp image. This processing enhances the edge portion of the image.

The above processing is realized by the D-FF's 75 to 77 in FIG. 4A. The D-FF's 75 to 77 form a matrix for the Laplacian operation. More specifically, the coefficient −1 of the multiplier 79 is used for the calculation of pixel (i, j+1); the coefficient −1 of the multiplier 710, for pixel (i−1, j); the coefficient 5 of the multiplier 711, for pixel (i, j); the coefficient −1 of the multiplier 712, for pixel (i+1, j); and the coefficient −1 of the multiplier 713, for pixel (i, j−1).

<Pattern Generator>

Figure 5:
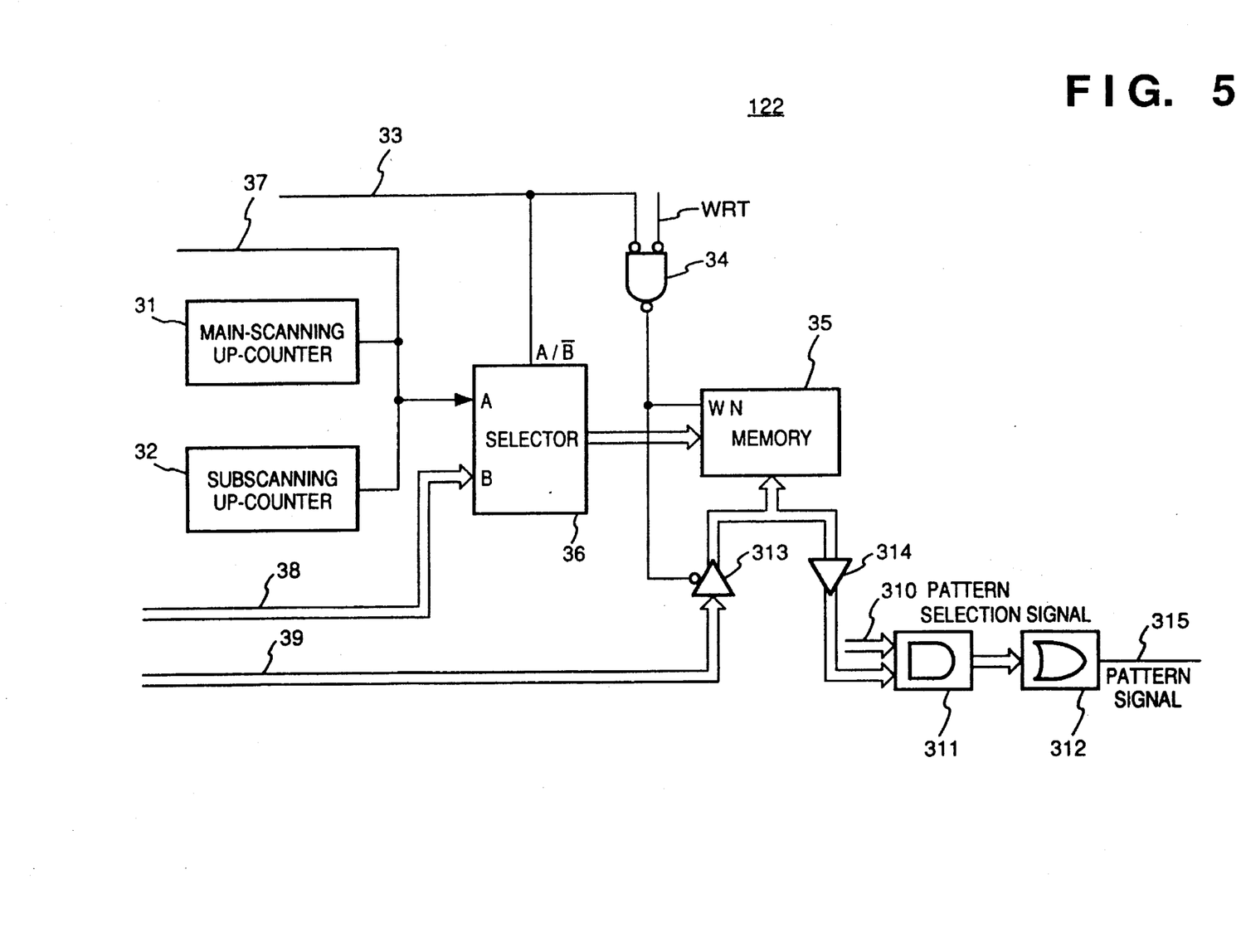
FIG. 5 is a block diagram showing the construction of a pattern generator which generates a pattern for a hatch area of the hatching processing in the present embodiment.

FIG. 5 is a block diagram showing the construction of the pattern generator 122 for generating a hatching pattern. In FIG. 5, numeral 35 denotes a memory comprising a RAM; 31, a raw-address direction up-counter for counting raw addresses of the memory 35; 32, a column-address direction up-counter for counting column addresses of the memory 35; and 34, a NAND gate. A hatching pattern of a predetermined unit is stored into the memory 35. Upon hatching, the stored hatching pattern is repeatedly read out of the memory 35 to generate a necessary hatching pattern. To control this repetitive hatching timing, the raw-address direction up-counter 31 and the column-address direction up-counter 32 are used for monitoring hatching pattern reading addresses. The raw-address direction corresponds to the main-scanning direction of original image reading; and the column-address direction, the subscanning direction. Numeral 36 denotes a selector. In a case where the value of control signal 33 from the CPU 111 is "0", the selector 36 selects output data so that address data from the address bus 38 is inputted into an address of the rewritable memory 35.

Write signal (WRT: low active) from the CPU 111 is inputted into one input terminal of the NAND gate 34. That is, if the CPU 111 performs a writing operation on the memory 35 while the address data from the address bus 38 is being inputted into the address of memory 35, the WRT is inputted into the memory 35, and at the same time, data from the data bus 39 is inputted through tristate buffer 313 into a data storing area of the memory 35. Thus, the CPU 111 can rewrite the contents of the memory 35 by outputting a control signal 33 of level "0".

On the other hand, if a CPU outputs the control signal 33 of level "1", an address for reading a pattern is inputted into the memory 35. At this time, the pattern read out of the memory 35 is inputted into the AND circuit 311 via buffer 314. In this embodiment, the memory 35 has a byte structure and it simultaneously outputs eight types of patterns through the data bus 39. Accordingly, the CPU 111 outputs eight-bit pattern selection signal 310 to select any one desired pattern out of those patterns, and the OR circuit 312 outputs the selected pattern. The OR circuit 312 converts the eight-bit signal into a one-bit signal. In FIG. 5, numeral 315 denotes the pattern signal. Numeral 37 denotes a control signal based on the instruction from the operating unit 112 to specify an area to be hatched.

<White-Outline Signal Generator>

Figure 6:
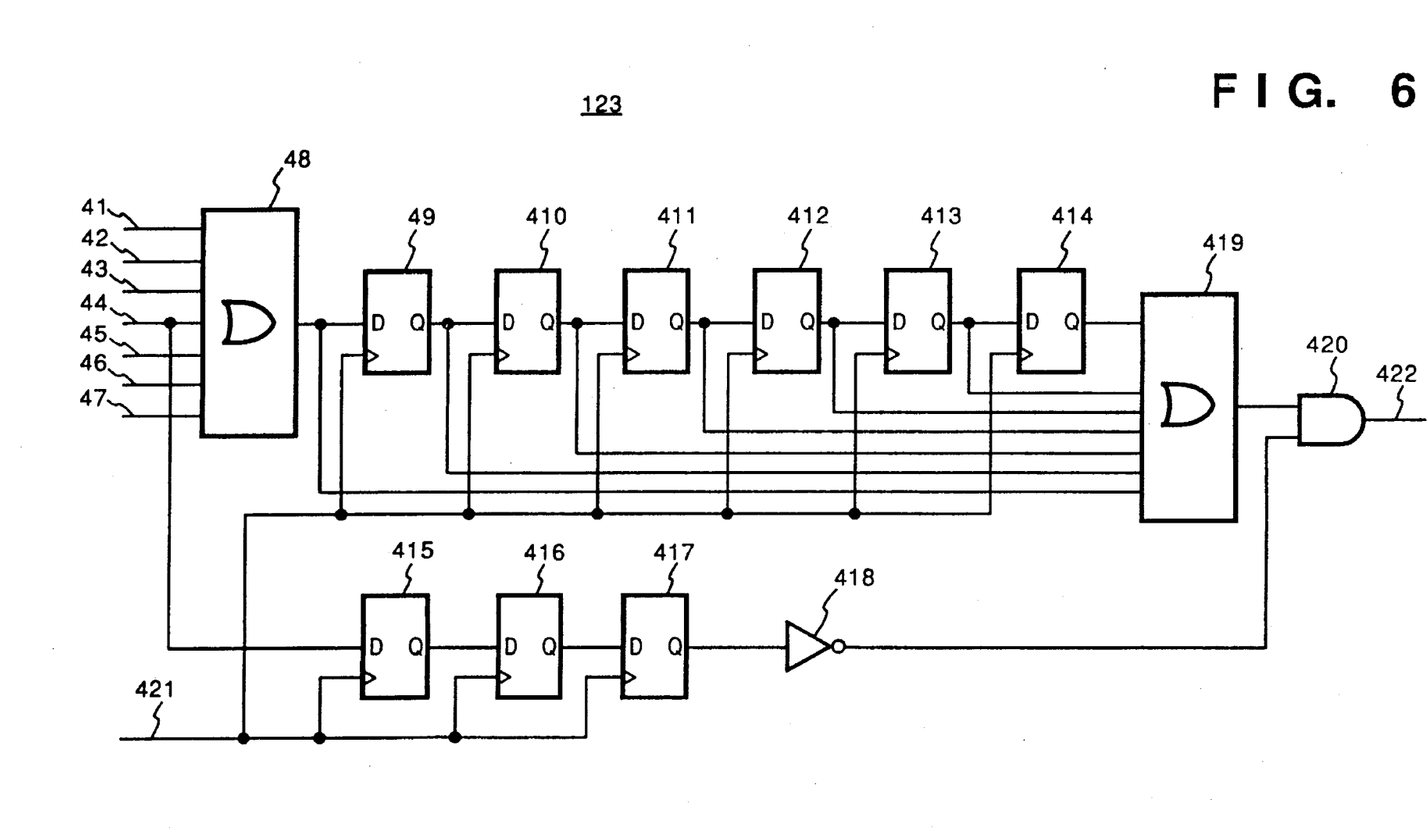
FIG. 6 is a block diagram showing the construction of a white-outline signal generator.

FIG. 6 is a block diagram showing the detailed construction of the white-outline signal generator 123. In FIG. 6, numerals 41 to 47 denote binary image signals from the hatching synthesizer 124 through a FIFO memory (to be described later) for several lines (seven lines in this embodiment). The signals 41 to 47 enter the white-outline signal generator 123. As the CCD 101 reads an original image by scanning in the subscanning direction with respect to the original image at a fixed speed, inputting a read image signal for one line in the main-scanning direction is repeated for several (seven) lines. In this embodiment, the binary image signals 41 to 47 are inputs for seven lines in the subscanning direction. Numeral 48 denotes a seven-input OR circuit; 49 and 410 to 417, D-FF; 418, a NOT circuit; 419, a seven-input OR circuit; and 420, an AND circuit.

Numeral 421 denotes the image transfer clock (ICLK) in FIG. 4A; and the 422, the output white-outline signal. The output from the D-FF 417 is an image signal of interest.

Figure 7:
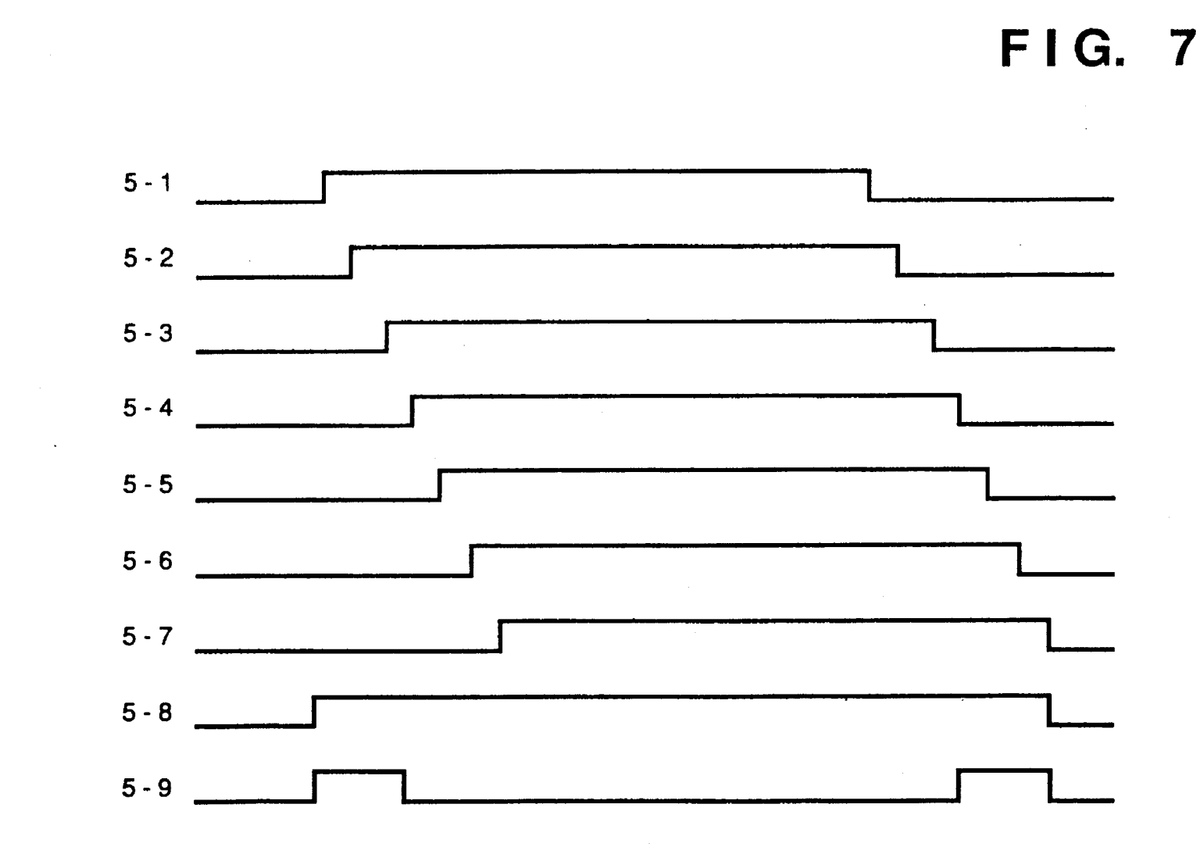
FIG. 7 is a timing chart showing timings upon white-outline signal generation by the white-outline signal generator in FIG. 6.

FIG. 7 is a timing chart showing timings upon generating the white-outline signal by the white-outline signal generator 123. For the sake of simplification of explanation, only the principle of white-outline generation in the main-scanning direction will be described below.

The line represented by the image signal 44 among the seven line signals 41 to 47 in the subscanning direction corresponds to a line of interest. In FIG. 7, image signal 5-1 is inputted into the line of interest, and the image signals 41 to 43 and 45 to 47 are of low level. That is, when the signal 5-1 enters only the line of interest, the output from the D-FF 49 is signal 5-2; from the D-FF 410, signal 5-3; from the D-FF 411, signal 5-4; from the D-FF 412, signal 5-5; from the D-FF 413, signal 5-6; and from the D-FF 414, signal 5-7. At this time, the output from the seven-input OR circuit 419 is signal 5-8. As the output from the D-FF 417 is signal 5-4, the output from the AND circuit 420 is signal 5-9.

Regarding the main-scanning direction, the signal 5-9 is an exterior outline signal with respect to the image signal 5-4. This principle can be applied to the outline signal regarding the subscanning direction. In this manner, a signal indicative of the white-outline portion shown in FIG. 3B with respect to the image shown in FIG. 3A is outputted as the signal 422.

<Hatching Synthesizer>

Figure 8:
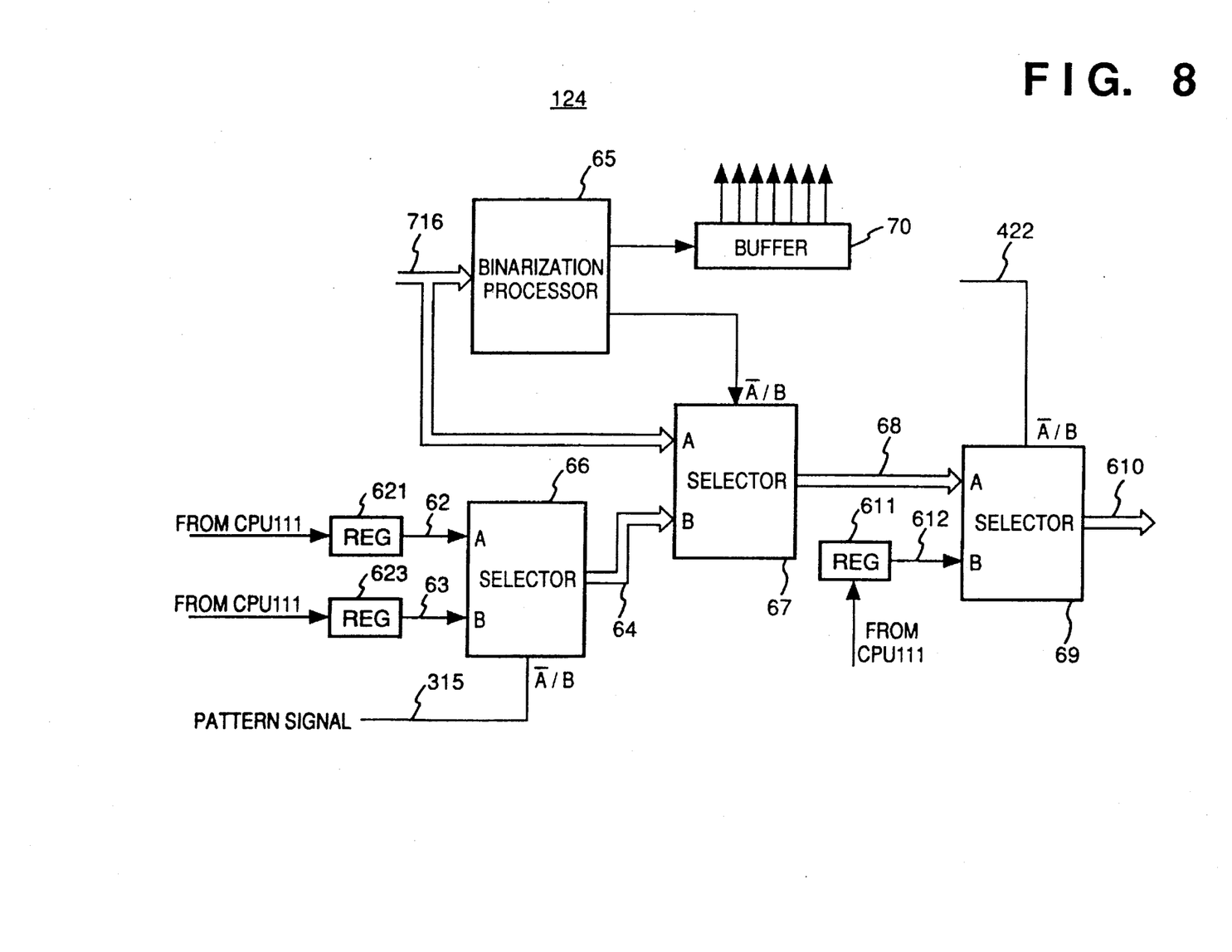
FIG. 8 is a block diagram showing the construction of hatching synthesizer 124.

FIG. 8 is a block diagram showing the construction of the hatching synthesizer 124. In FIG. 8, numerals 66, 67 and 69 denote selectors; 611, 621 and 622, registers (REG) in which values are set by the CPU 111; 62, a multivalued density signal, outputted from the REG 621, indicative of the density of a background of the hatched area; 63, a multivalued density signal, outputted from the REG 631, indicative of the density of the hatching marks of the hatched area; 64, a multivalued pattern signal outputted from the selector 66; 65, a binarization processor for binarization with one threshold; 68, an image signal outputted from the selector 67; 612, a multivalued density signal, outputted from the REG 611, indicative of the density of a white-outline portion; and 70, a FIFO buffer for holding binary image signals for seven lines. The outputs from the buffer 70 enter the white-outline signal generator 123 as the binary image signals 41 to 47.

Next, the operation of the hatching synthesizer 124 will be described.

First, the pattern signal 315, the background density signal 62 and the hatching mark density signal 63 enter the selector 66, which selects the density signal 62 or the density signal 63 in accordance with the pattern signal 315 and outputs the signal as the multivalued pattern signal 64. The binarization processor 65 binarizes the sharpened multivalued image signal 716 and provides the binary image signal for the white-outline signal generator 123 and the selector 67 via the buffer 70. In accordance with the output signal from the binarization processor 65, the selector 67 selects the image signal 716 regarding the black area of the original image, while regarding the areas other than the black area, it selects the pattern signal 64 as output image signal 68 indicative of the density of the pattern added by the hatching. To set the density of the white-outline, the selector 69 inputs the image signal 68 from the selector 67 and the density signal 612, and selects the image signal 68 or the density signal 612 in accordance with the white-outline signal 422. Thus, the selector 69 outputs the hatched image signal 610.

<Area Specification>

Figure 9:
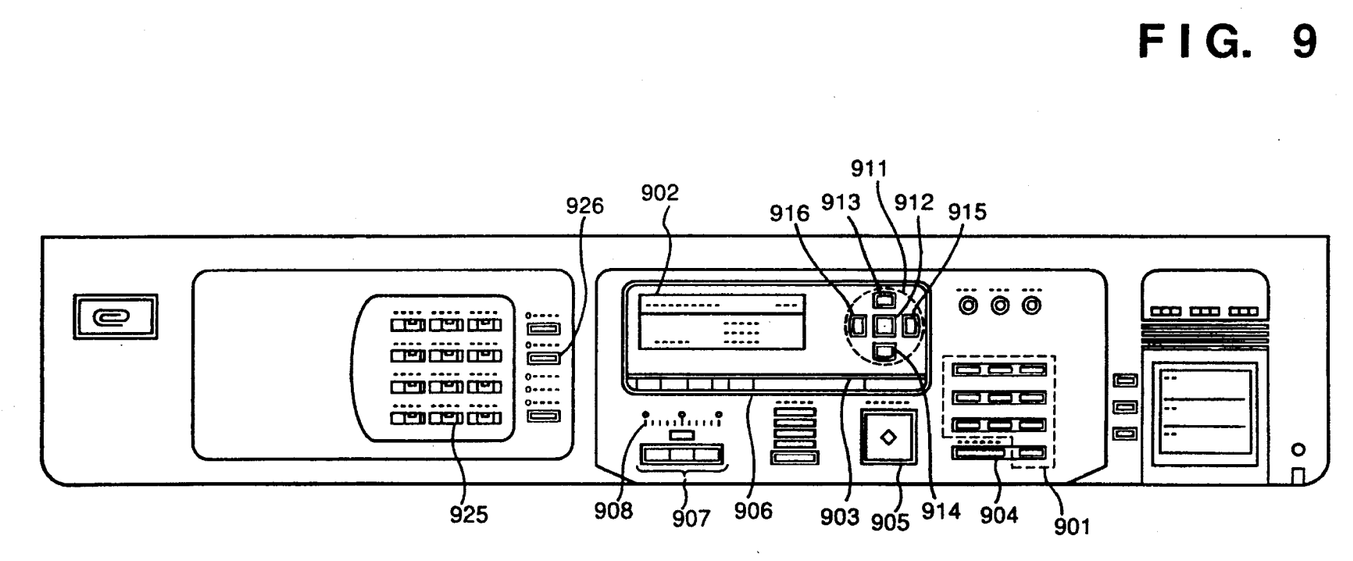
FIG. 9 is a top plan view of operating unit 112.

In the digital copying machine, specifying an area to be hatched (hereinafter "area specification") can made by a digitizer, a ten-key input from the operating unit 112 or marker-specification on an original. In the present embodiment, to simplify the explanation, the ten-key input from the operating unit 112 will be described.

FIG. 9 is a top plan view of the operating unit 112. In FIG. 9, numeral 901 denotes ten keys for inputting numerals from zero to nine upon specification of the number of copies and a zooming rate; 902, a liquid crystal display (LCD) panel for displaying a machine status, a copying mode setting, operation instructions, a paper size and a zooming rate; 903, a reset key for initializing a current mode; 904, a clear/stop key for stopping the operation of the machine, or when the machine is not operating, for clearing a numeric value set by the ten keys.

Numeral 905 denotes a copying start key for instructing to start copying operation; 906, a selection key for selecting a paper size; 907, a density adjustment key for changing a copying density from light to dark; 908, nine light emitting diodes (LED) for indicating a current density level; 911, a cursor moving unit for selecting the contents of the LCD panel 902. More specifically, in the cursor moving unit 911, keys 912 (OK), 913 (UP), 914 (DOWN), 915 (RIGHT) and 916 (LEFT) are employed for moving the cursor.

Numeral 925 denotes an area specification key used in area specification described below; and 926, an OK key for confirmation of a specified area.

Next, an actual area specification procedure will be described with reference to FIGS. 10A to 10D.

Figure 10A:
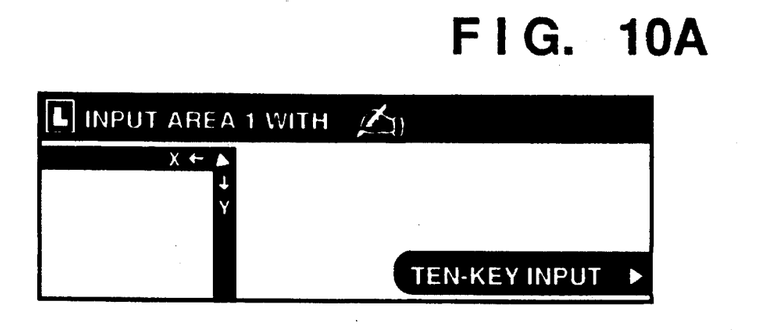
FIGS. 10A to 10D illustrate an area specification procedure.
Figure 10B:
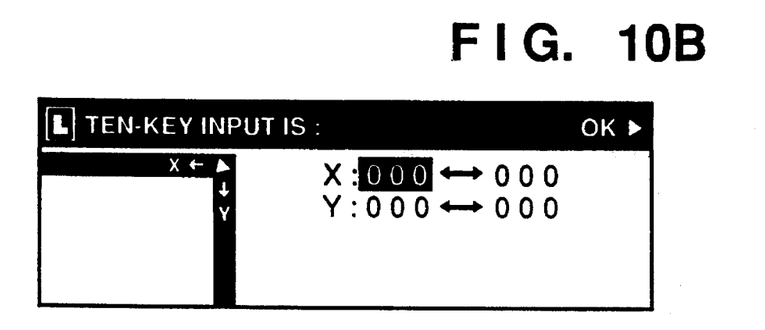

First, the area specification key 925 is pressed. At this time, the LCD panel 902 displays an image as shown in FIG. 10A. Next, the cursor moving unit 911 is used to move the cursor to "TEN-KEY INPUT", and the OK key 912 is pressed to confirm the specification. The LCD panel 902 displays an image as shown in FIG. 10B. The area specification is made by inputting a coordinate values of the starting point and that of the terminating point in X and Y directions using the ten-keys 901. The X direction corresponds to the main-scanning direction; Y direction, the subscanning direction. Thereafter, when the cursor is moved to position "OK" as shown in FIG. 10B and the OK key 912 is pressed, the LCD 902 displays an image as shown in FIG. 10C.

Figure 10C:
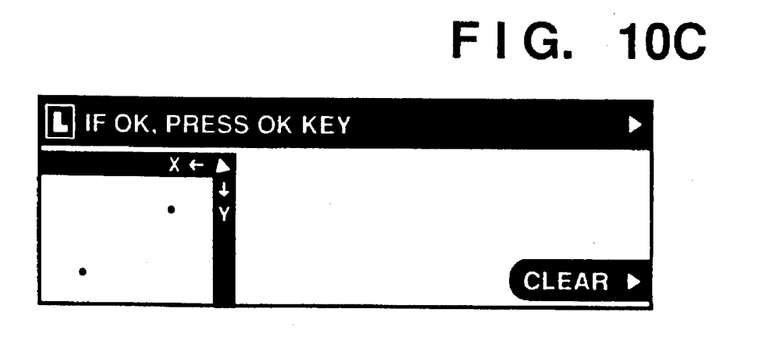
Figure 10D:
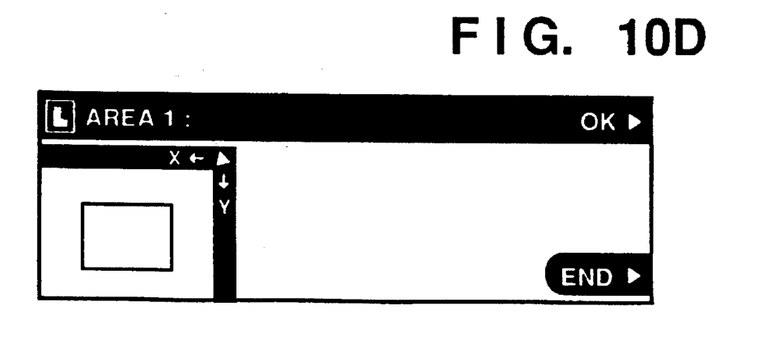

In the image in FIG. 10C, the upper right end and the lower left end of the specified area (rectangular area) are represented by two dots. If the displayed dot positions are satisfactory to the user, the user presses the OK key 926. The LCD panel 902 changes the display image to that as shown in FIG. 10D, then the area specification ends.

As described above, according to the present embodiment, before hatching upon character information in a specified area to be hatched, the Laplacian processing is performed as sharpening to enhance the edge portion of the character information. Thus, thinning of the character due to addition of white-outline can be prevented. Further, regarding the non-specified area, a copying-output with fidelity to the original image can be made.

Figure 11:
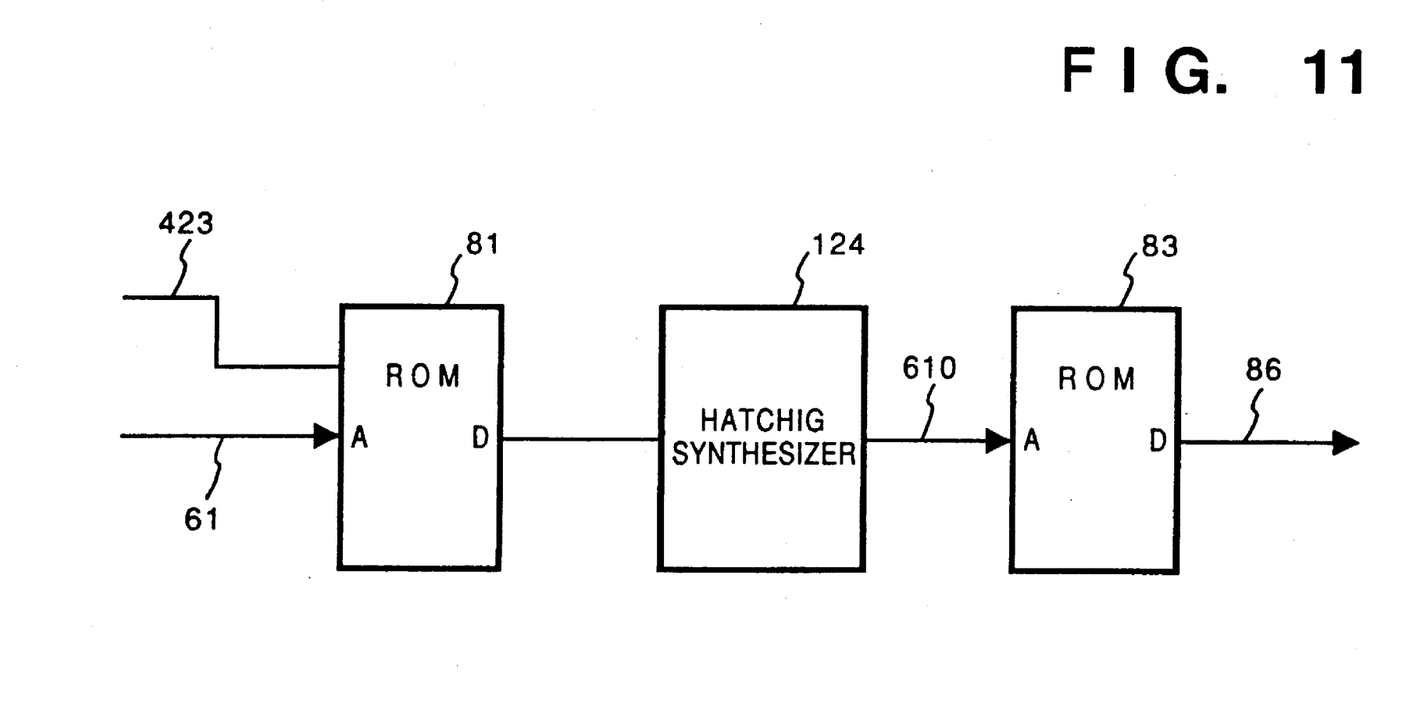
FIG. 11 is a block diagram showing the construction of a circuit which changes the density of an image signal in a hatched area to prevent thinning of a character caused by addition of white-outline.

In the present embodiment, to prevent thinning of a character caused by addition of white-outline, the sharpening processor 121 performs the Laplacian processing upon an image signal to enhance the edge portion of the image; however, the anti-thinning processing is not limited to this method. For example, as shown in FIG. 11, the sharpening processor 121 may be replaced with a look-up table comprising a ROM to change the density of the character in the hatch area in accordance with hatching specification signal 423 generated by the area specification in FIGS. 10A to 10D. This arrangement also prevents thinning of a character due to addition of white-outline.

In FIG. 11, numerals 81 and 83 denote look-up tables (LUT); and 61, a corrected digital multivalued image signal directly inputted from the black/white corrector 106. The image signal 61 and the hatching specification signal 423 are inputted into address input terminal (A) of the LUT 81. In the hatching synthesizer 124, a white-outline portion and a hatching pattern are added to the image signal. The output 610 from the hatching synthesizer 124 is inputted into address input terminal (A) of the LUT 83. The LUT 83 performs conversion corresponding to the printer output character upon the image signal 610, and outputs the conversion result as image signal 86.

The LUT 81 is a look-up table for density adjustment, which passes the input image signal 61 without any conversion if the signal resides without the specified area, while raises the density of the signal 61 if it resides within the specified area.

Accordingly, the LUT 81 raises the density value of an image signal corresponding to the specified area to a predetermined level and outputs the density-raised image signal.

Figure 12:
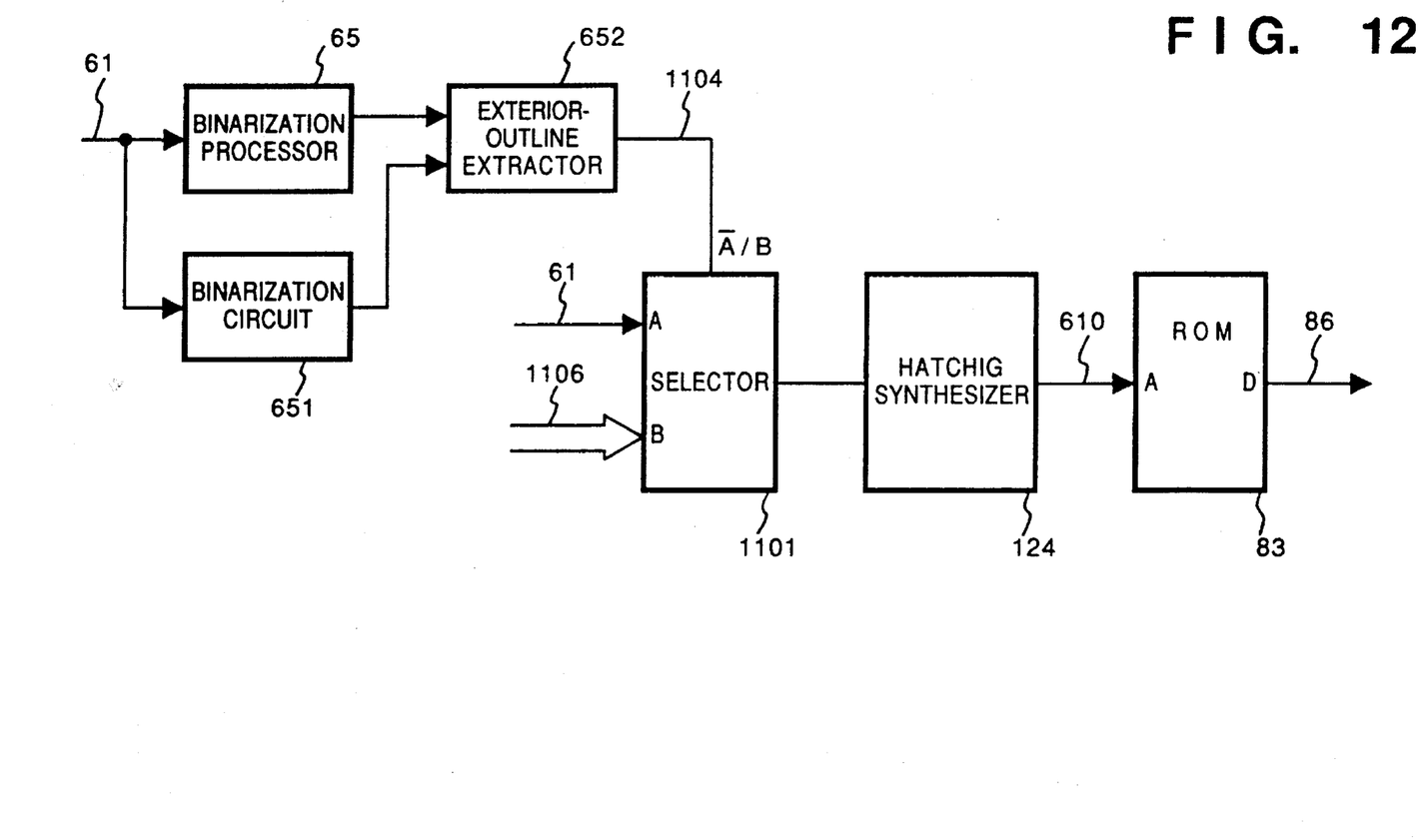
FIG. 12 is a block diagram showing the construction of a circuit for fatting a character outline portion to prevent thinning of a character caused by addition of a white-outline.

To prevent thinning of a character caused by addition of white-outline, circuits for fatting the character outline in advance may be provided before the hatching synthesizer 124, as shown in FIG. 12.

In FIG. 12, numeral 651 denotes a binarization circuit which has one threshold different from that of the binarization processor 65; 652, an exterior-outline extractor for inputting outputs from the binarization processor 65 and the binarization circuit 651, and generating signal 1104 indicative of an exterior-outline portion of the character; and 1101, a selector for selecting the digital multivalued image signal 61 which has been black/white-corrected or a image signal 1106 indicative of a fatted portion in accordance with the signal 1104. The signal 1106 has a predetermined density. The exterior-outline extractor 652 is a logic circuit comprising a combination of a comparator, an AND circuit, an OR circuit and the like. The exterior-outline extractor 652 inputs the output from the binarization processor 65 as a normal output (representing normal outline of the character image) and the output from the binarization circuit 651 (representing outline thicker than that of the normal outline), determines what portion will be the exterior-outline of the character upon fatting the character, and outputs the determination result as the signal 1104.

The selector 1101 outputs an image signal representing a character having an outline thicker than that of an image represented by the output from the binarization processor 65. It should be noted that the image signal from the selector 1101 is processed in the same manner as that made in FIG. 11.

Further, the background area of the character image is not limited to the hatched area. For example, an image pattern such as a texture pattern can be synthesized.

Moreover, an original image is not limited to a character image; the present invention can be applied to any image including a line image.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of adding a white-outline to an outline of a character image with which a predetermined pattern is synthesized, comprising the steps of:

generating the predetermined pattern;

inputting an image signal;

sharpening an edge of the character image represented by the image signal;

creating data for adding a white-outline to the outline of the character image; and synthesizing the predetermined pattern with the sharpened character image in accordance with the created data so that the white-outline can be added to the outline of the character image.

2. An image processing apparatus for adding a white-outline to an outline of a character image with which a predetermined pattern is synthesized, comprising:

generation means for generating the predetermined pattern;

input means for inputting an image signal;

sharpening means for sharpening an edge of the character image represented by the image signal;

creation means for creating data for adding a white-outline to the outline of the character image; and synthesizing means for synthesizing the predetermined pattern with the sharpened character image in accordance with the data created by said creation means so that the white-outline can be added to the outline of the character image.

3. The apparatus according to claim 2, wherein the predetermined pattern includes a hatching pattern.

4. The apparatus according to claim 3, further comprising:

specifying means for specifying an area in which the predetermined pattern is synthesized.

5. The apparatus according to claim 3, wherein the image signal is a multivalued image signal.

6. The apparatus according to claim 5, wherein said sharpening means includes Laplacian calculation means for performing the Laplacian processing upon the multivalued image signal.

7. The apparatus according to claim 5, wherein said synthesizing means includes:

setting means for setting a density value of the hatching pattern generated by said generation means;

binarization means for binarizing the multivalued image signal;

buffer means for passing the binary image signal binarized by said binarization means to said creation means;

determination means for determining a portion corresponding to a black pixel and a portion corresponding to a white pixel from the binarized image signal; and selection means for selectively outputting the multivalued image signal or the density value set by said setting means in accordance with a determination result by said determination means.

8. The apparatus according to claim 7, wherein said creation means includes extraction means for receiving the binary image signal binarized by said binarization means using said buffer means, and extracting an outline portion of the character image based on the binary image signal.

9. The apparatus according to claim 4, wherein the image signal is a multivalued image signal, and wherein said sharpening means includes density adjustment means for, if the multivalued image signal corresponds to an image within the area in which the predetermined pattern is synthesized, changing the density value of the multivalued image signal.

10. The apparatus according to claim 5, wherein said sharpening means includes fatting means for fatting the outline of the character image.

11. The apparatus according to claim 10, wherein said fatting means includes:

first binarization means for binarizing the multivalued image signal with a first threshold value to obtain an exterior-outline of the character image without fatting the outline of the character image;

second binarization means for binarizing the multivalued image signal with a second threshold value smaller than the first threshold value; and extraction means for extracting the fatted exterior-outline of the character image based on the two binary signals binarized by said first and second binarization means.

* * * * *

UNITED STATES PATENT AND TRADEMARK OFFICE
CERTIFICATE OF CORRECTION

PATENT NO. : 5,563,713
DATED : October 8, 1996
INVENTOR(S) : TAKASHI SUGIURA

It is certified that error appears in the above-indentified patent and that said Letters Patent is hereby corrected as shown below:

<u>IN THE DRAWINGS</u>:

<u>SHEET 11, FIGURE 11</u>,

"HATCHIG" should read --HATCHING--.

<u>SHEET 12, FIGURE 12</u>,

"HATCHIG" should read --HATCHING--.

<u>COLUMN 1</u>:

Line 10, "apparatus*" should read --apparatus--; and
Line 48, "pattern;" should read --pattern,--.

<u>Column 7</u>:

Line 66, "raises" should read --raising--.

Signed and Sealed this

Eighteenth Day of March, 1997

Attest:

BRUCE LEHMAN

Attesting Officer    Commissioner of Patents and Trademarks